US012243115B2

(12) United States Patent
Geng et al.

(10) Patent No.: US 12,243,115 B2
(45) Date of Patent: Mar. 4, 2025

(54) PROPERTY RIGHT CONFIRMATION AND TRANSFER METHODS AND SYSTEMS, ELECTRONIC DEVICE, AND STORAGE MEDIUM

(71) Applicant: Shanghai Weilian Information Technology Co., Ltd., Shanghai (CN)

(72) Inventors: Qiangle Geng, Shanghai (CN); Jianliang Gu, Shanghai (CN)

(73) Assignee: Shanghai NanoJClean Technology Co., Ltd., Shanghai (CN)

( * ) Notice: Subject to any disclaimer, the term of this patent is extended or adjusted under 35 U.S.C. 154(b) by 251 days.

(21) Appl. No.: 17/785,327

(22) PCT Filed: Dec. 9, 2020

(86) PCT No.: PCT/CN2020/134768
§ 371 (c)(1),
(2) Date: Jun. 14, 2022

(87) PCT Pub. No.: WO2021/121090
PCT Pub. Date: Jun. 24, 2021

(65) Prior Publication Data
US 2022/0414809 A1 Dec. 29, 2022

(30) Foreign Application Priority Data
Dec. 17, 2019 (CN) .......................... 201911299661.8

(51) Int. Cl.
*G06Q 50/18* (2012.01)
*G06F 21/64* (2013.01)
(Continued)

(52) U.S. Cl.
CPC .......... *G06Q 50/184* (2013.01); *G06F 21/64* (2013.01); *G06Q 20/36* (2013.01);
(Continued)

(58) Field of Classification Search
CPC .. G06Q 50/184; G06Q 20/36; G06Q 20/3825; G06Q 20/3827; G06Q 20/3829;
(Continued)

(56) References Cited

U.S. PATENT DOCUMENTS 10,102,526 B1 * 10/2018 Madisetti ............. G06Q 20/389
11,308,487 B1 * 4/2022 Foster ................ G06Q 20/3829
(Continued)

FOREIGN PATENT DOCUMENTS

| CN | 107730384 A | 2/2018 |
|---|---|---|
| CN | 107851284 A | 3/2018 |

(Continued)

*Primary Examiner* — Florian M Zeender
*Assistant Examiner* — Karma A El-Chanti
(74) *Attorney, Agent, or Firm* — Downs Rachlin Martin PLLC

(57) ABSTRACT

The present disclosure discloses methods, systems, an electronic device, and a storage medium for confirming a property right and for transferring a property right. The present disclosure realizes the confirmation and transfer of the ownership of a property and traceback of the ownership of the property, making the process of right confirmation and implementation is more efficient and secure, and improving the user experience.

9 Claims, 8 Drawing Sheets

(51) Int. Cl.
  *G06Q 20/36* (2012.01)
  *G06Q 20/38* (2012.01)
  *H04L 9/00* (2022.01)

(52) U.S. Cl.
  CPC ..... *G06Q 20/3825* (2013.01); *G06Q 20/3827* (2013.01); *G06Q 20/3829* (2013.01); *H04L 9/50* (2022.05); *G06Q 2220/00* (2013.01)

(58) Field of Classification Search
  CPC .... G06Q 2220/00; G06Q 50/18; G06F 21/64; G06F 21/602; H04L 9/50
  See application file for complete search history.

(56) References Cited

U.S. PATENT DOCUMENTS

| | | | |
|---|---|---|---|
| 11,917,090 B2* | 2/2024 | Juntilla | H04L 9/3239 |
| 2017/0091756 A1 | 3/2017 | Stern et al. | |
| 2017/0330174 A1 | 11/2017 | Demarinis et al. | |
| 2019/0019180 A1 | 1/2019 | Coburn et al. | |
| 2019/0080402 A1 | 3/2019 | Molinari et al. | |
| 2019/0080404 A1 | 3/2019 | Molinari et al. | |
| 2019/0295069 A1* | 9/2019 | Pala | G06Q 20/3678 |
| 2019/0356481 A1* | 11/2019 | Spector | H04L 9/3247 |
| 2020/0043001 A1* | 2/2020 | Ng | H04L 63/06 |
| 2020/0118093 A1* | 4/2020 | Ko | G06Q 20/38215 |
| 2020/0184546 A1* | 6/2020 | Crumb | G06Q 30/0639 |
| 2020/0320529 A1* | 10/2020 | Lyadvinsky | H04L 9/3239 |

FOREIGN PATENT DOCUMENTS

| | | |
|---|---|---|
| CN | 109716375 A | 5/2019 |
| CN | 109919618 A | 6/2019 |
| CN | 110046999 A | 7/2019 |
| CN | 110201400 A | 9/2019 |

* cited by examiner

PROPERTY RIGHT CONFIRMATION AND TRANSFER METHODS AND SYSTEMS, ELECTRONIC DEVICE, AND STORAGE MEDIUM

TECHNICAL FIELD

The present disclosure relates to the field of blockchain technologies, in particular, to blockchain-based property right confirmation and transfer methods and systems, an electronic device, and a storage medium.

BACKGROUND

Property ownership is a right and interest asset of an owner, but unlike other types of assets, the ownership of certain properties is difficult to prove and realized, which makes it difficult for the true owner's rights and interests to be guaranteed when ownership issues arise.

For confirmation of a right of ownership, a conventional confirmation process involves the participation of multiple parties, such as collaboration and transfer of material data among an owner of a property, a notary, and a custodian, which leads to high data transmission and verification costs, and there are also trust issues. For right implementation (such as ownership transfer), the owner of a property needs to provide relevant identification and documents to prove and implement rights thereof, but the rights are difficult to be used by others in a paid manner. For right safeguard, the verification process for relevant identification and documents that the owner of a property needs to provide is complicated and long, and the cost of trust is high, and self-evidence is difficult.

Therefore, existing processes of confirming, implementing, and safeguarding property ownership have the following defects: 1) the confirmation process takes a long time and has poor effectiveness; 2) it is difficult to realize and circulate during the implementation of a right; and 3) in the process of safeguarding a right, it is difficult to collect evidence and trace back to the source, and the trust cost is high.

SUMMARY

The technical problem to be solved by the present disclosure is to overcome the disadvantages in terms of property ownership in the prior art of long time consumed for right confirmation, difficulty in right implementation and realization, difficulty in right safeguard and evidence collection, difficulty in traceback, and the like, and to provide blockchain-based property right confirmation and transfer methods and systems, an electronic device, and a storage medium.

The present disclosure solves the above technical problems through the following technical solutions.

The present disclosure provides a blockchain-based method for confirming a property right. The method for confirming a right includes:
  presetting encoded information corresponding to a property;
  obtaining a corresponding wallet address according to the encoded information;
  storing a correspondence between the encoded information and the wallet address in a smart contract of a blockchain;
  generating a random number and sending the random number to a target object;
  obtaining a first wallet address corresponding to a target property in the smart contract obtained by the target object according to the random number, target encoded information corresponding to the target property, and a target private key;
  obtaining a target wallet address corresponding to the target encoded information in the smart contract according to the correspondence; and
  judging whether the first wallet address is consistent with the target wallet address, and if yes, determining that the target object owns the target property; otherwise, determining that the target object does not own the target property.

In one example, the step of obtaining a corresponding wallet address according to the encoded information includes:
  randomly generating a private key according to the encoded information, and obtaining a corresponding public key with an elliptic curve algorithm and according to the private key; and
  obtaining the corresponding wallet address with a hash algorithm and according to the public key.

In one example, the step of obtaining a first wallet address corresponding to a target property in the smart contract obtained by the target object according to the random number, target encoded information corresponding to the target property, and a target private key includes:
  obtaining first private key signature information obtained by the target object according to the random number, the target encoded information corresponding to the target property, and the target private key;
  obtaining a corresponding first public key according to the first private key signature information; and
  obtaining the first wallet address corresponding to the target property in the smart contract according to the first public key.

In one example, the step of obtaining first private key signature information obtained by the target object according to the random number, the target encoded information corresponding to the target property, and the target private key includes:
  obtaining a hash value calculated by the target object with an asymmetric encryption algorithm and according to the random number and the target encoded information corresponding to the target property; and
  obtain the first private key signature information that is calculated by the target object according to the target private key corresponding to the target property and the hash value; and the step of obtaining a corresponding first public key according to the first private key signature information comprises:
  calculating the corresponding first public key according to the first private key signature information and the hash value.

The present disclosure also provides a blockchain-based method for transferring the ownership of a property, which is implemented based on the above-mentioned blockchain-based method for confirming the ownership of a property, and the ownership transfer method includes:
  presetting ownership transfer data corresponding to a to-be-traded property;
  generating a transaction request according to the ownership transfer data and sending the transaction request to a blockchain node; and
  upon receiving the transaction request on the blockchain node, transferring the ownership of the to-be-traded property according to the ownership transfer data.

In one example, the ownership transfer data includes a smart contract address, transaction parameters, and a transaction signature.

The transaction parameters include a transfer instruction, first encoded information corresponding to the to-be-traded property, and a new wallet address.

The step of transferring the ownership of the to-be-traded property according to the ownership transfer data includes:
transferring the address of the to-be-traded property in a smart contract to a new wallet address according to the first encoded information; and/or
after the step of generating a transaction request according to the ownership transfer data and sending the transaction request to the blockchain node, and before the step of transferring the ownership of the to-be-traded property according to the ownership transfer data, the method further includes:
judging whether a data format of the ownership transfer data satisfies a preset condition, and if yes, executing the step of transferring the ownership of the to-be-traded property according to the ownership transfer data; otherwise, generating an alert message.

In one example, the step of presetting ownership transfer data corresponding to a to-be-traded property includes:
generating an authorization instruction for transferring the ownership of the to-be-traded property to an authorized object; and
presetting the ownership transfer data corresponding to the to-be-traded property according to the authorization instruction; and The step of transferring the ownership of the to-be-traded property according to the ownership transfer data includes:
transferring the ownership of the to-be-traded property to the authorized object according to the ownership transfer data.

In one example, the step of presetting ownership transfer data corresponding to a to-be-traded property includes:
obtaining an application request sent by a requesting object for requesting the ownership of the to-be-traded property; and
presetting the ownership transfer data corresponding to the to-be-traded property according to the application request; and The step of transferring the ownership of the to-be-traded property according to the ownership transfer data includes:
transferring the ownership of the to-be-traded property to the requesting object according to the ownership transfer data.

The present disclosure also provides a blockchain-based system for confirming a property right, the system for confirming a right including an information preset module, a wallet address obtaining module, a storage module, a generating module, a first address obtaining module, a target address obtaining module, and a first judging module.

The information preset module is configured to preset encoded information corresponding to a property.

The wallet address obtaining module is configured to obtain a corresponding wallet address according to the encoded information.

The storage module is configured to store a correspondence between the encoded information and the wallet address in a smart contract of a blockchain.

The generating module is configured to generate a random number and send the random number to a target object.

The first address obtaining module is configured to obtain a first wallet address corresponding to a target property in the smart contract obtained by the target object according to the random number, target encoded information corresponding to the target property, and a target private key.

The target address obtaining module is configured to obtain a target wallet address corresponding to the target encoded information in the smart contract according to the correspondence.

The first judging module is configured to judge whether the first wallet address is consistent with the target wallet address, and if yes, determine that the target object owns the target property; otherwise, determine that the target object does not own the target property.

In one example, the wallet address obtaining module is configured to randomly generate a private key according to the encoded information, and obtain a corresponding public key with an elliptic curve algorithm and according to the private key.

The wallet address obtaining module is further configured to obtain the corresponding wallet address with a hash algorithm and according to the public key.

In one example, the first address obtaining module includes a signature information obtaining unit, a first public key obtaining unit, and a first address obtaining unit.

The signature information obtaining unit is configured to obtain first private key signature information obtained by the target object according to the random number, the target encoded information corresponding to the target property, and the target private key.

The first public key obtaining unit is configured to obtain a corresponding first public key according to the first private key signature information.

The first address obtaining unit is configured to obtain the first wallet address corresponding to the target property in the smart contract according to the first public key.

In one example, the signature information obtaining unit is configured to obtain a hash value that is calculated by the target object with an asymmetric encryption algorithm and according to the random number and the target encoded information corresponding to the target property; obtain the first private key signature information that is calculated by the target object according to the target private key corresponding to the target property and the hash value.

The first public key obtaining unit is configured to calculate the corresponding first public key according to the first private key signature information and the hash value.

The present disclosure also provides a blockchain-based system for transferring the ownership of a property. The ownership transferring system is implemented based on the blockchain-based system for confirming a property right. The ownership transferring system includes a data preset module, a request generating module, and a transfer module.

The data preset module is configured to preset ownership transfer data corresponding to a to-be-traded property.

The request generating module is configured to generate a transaction request according to the ownership transfer data and sending the transaction request to a blockchain node the transfer module is configured to, upon receiving the transaction request on the blockchain node, transfer the ownership of the to-be-traded property according to the ownership transfer data.

In one example, the ownership transfer data includes a smart contract address, transaction parameters, and a transaction signature.

The transaction parameters include a transfer instruction, first encoded information corresponding to the to-be-traded property, and a new wallet address.

The transfer module is configured to transfer the address of the to-be-traded property in a smart contract to a new wallet address according to the first encoded information; and/or the ownership transferring system comprises a second judging module.

The second judging module is configured to judge whether a data format of the ownership transfer data satisfies a preset condition, and if yes, execute the step of transferring the ownership of the to-be-traded property according to the ownership transfer data; otherwise, generate an alert message.

In one example, the data preset module is configured to generate an authorization instruction for transferring the ownership of the to-be-traded property to an authorized object, and preset the ownership transfer data corresponding to the to-be-traded property according to the authorization instruction.

The transfer module is configured to transfer the ownership of the to-be-traded property to the authorized object according to the ownership transfer data.

In one example, the data preset module is configured to obtain an application request sent by a requesting object for requesting the ownership of the to-be-traded property, and preset the ownership transfer data corresponding to the to-be-traded property according to the application request.

The transfer module is configured to transfer the ownership of the to-be-traded property to the requesting object according to the ownership transfer data.

The present disclosure also provides an electronic device, including a memory, a processor, and a computer program stored on the memory and runnable on the processor. When executing the computer program, the processor implements the above-mentioned blockchain-based method for confirming a property right and/or the blockchain-based method for transferring the ownership of a property.

The present disclosure also provides a computer-readable storage medium on which a computer program is stored, and when the computer program is executed by a processor, steps of the above-mentioned blockchain-based method for confirming a property right and/or steps of the above-mentioned blockchain-based method for transferring the ownership of a property are realized.

The positive and progressive effects of the present disclosure are as follows.

In one example, encoded information of each property is preset, and a correspondence between the encoded information of each property and a wallet address is recorded in a smart contract of a blockchain; when it is necessary to verify whether an object owns a property, private key signature information is obtained through a random number, a private key provided by the object, and encoded information of the property, and then a public key and its corresponding wallet address are obtained. When the wallet address is consistent with a wallet address of the encoded information in the blockchain, the right confirmation is successful. By sending the ownership transfer data that is transferred directly or indirectly to a blockchain node, the transfer of the ownership of a property is realized; in addition, based on non-tamperable characteristics of blockchain information, the traceback of the ownership of a property is realized, which is convenient for safeguarding the ownership of the property. That is, the digitization of notarization of a property can be realized based on a blockchain, and then the digitization of the ownership of the property can be realized, and the path of confirming, implementing, and safeguarding the ownership can be optimized, making right confirmation and implementation processes more efficient and secure, thus improving the user experience. In addition, it also improves the transparency and fairness of the right confirmation and implementation processes.

DETAILED DESCRIPTION

The present disclosure will be further explained by way of examples below, but the present disclosure is not limited to the scope of the described examples.

EXAMPLE

Figure 1:
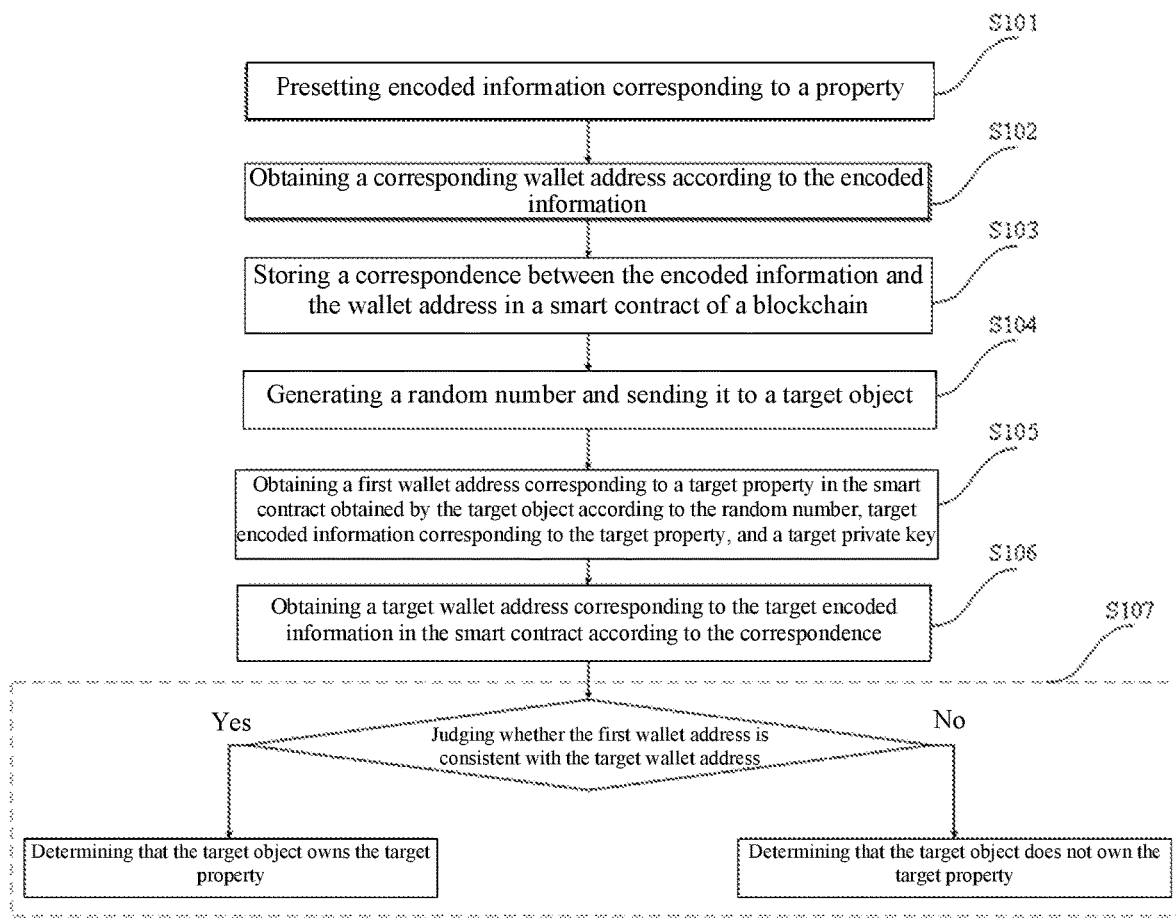
FIG. 1 is a flowchart of a blockchain-based method for confirming a property right according to Example 1 of the present disclosure.

As shown in FIG. 1, a blockchain-based method for confirming a property right in the illustrated example includes:
  S101, presetting encoded information corresponding to a property. In one example, presetting encoded information corresponding to a property includes using a smart contract to create, also referred to as using a smart contract to mint, a non-fungible cryptographic token (NFT) that is identified by the encoded information that includes, for example, a unique identification number. In some examples, an NFT smart contract may be used that is designed according to an NFT smart contract protocol, for example, the VIP-181 standard for NFT smart contracts on the VeChainThor network;
  S102, obtaining a corresponding wallet address according to the encoded information;
  S103, storing a correspondence between the encoded information and the wallet address in a smart contract of a blockchain. In one example, an NFT smart contract is used to generate an NFT and register the correspondence between the NFT and the wallet address of the owner of the NFT on a blockchain;
  that is, a mapping relationship between encoded information and wallet addresses is recorded in the smart contract, for example, gid=>address, where gid represents encoded information of the NFT, address represents a wallet address, and the wallet address represents that a user owns the NFT and a property that corresponds to or is associated with the NFT.

S104, generating a random number and sending it to a target object. In one example, a second party that wishes to verify that a first party owns a target object generates the random number;

S105, obtaining a first wallet address corresponding to a target property in the smart contract obtained by the target object according to the random number, target encoded information corresponding to the target property, and a target private key;

S106, obtaining a target wallet address corresponding to the target encoded information in the smart contract according to the correspondence;

S107, judging whether the first wallet address is consistent with the target wallet address, and if yes, determining that the target object owns the target property; otherwise, determining that the target object does not own the target property.

In this example, encoded information of each property is preset, for example, as described above, in the form of an NFT, and a correspondence between the encoded information of each property and a wallet address is recorded in a smart contract of a blockchain; when it is necessary to verify whether an object owns a property, private key signature information is obtained through a random number, a private key controlled by the object, and encoded information of the property, and then a public key and its corresponding wallet address are obtained. When the wallet address is consistent with a wallet address of the encoded information in the blockchain, the right confirmation is successful. That is, the digitalization of notarization of the property can be realized based on the blockchain, then the digitalization of the ownership of the property can be realized, and the path of ownership confirmation can be optimized, making the confirmation process more efficient and secure, and improving the user experience.

Example 2

Figure 2:
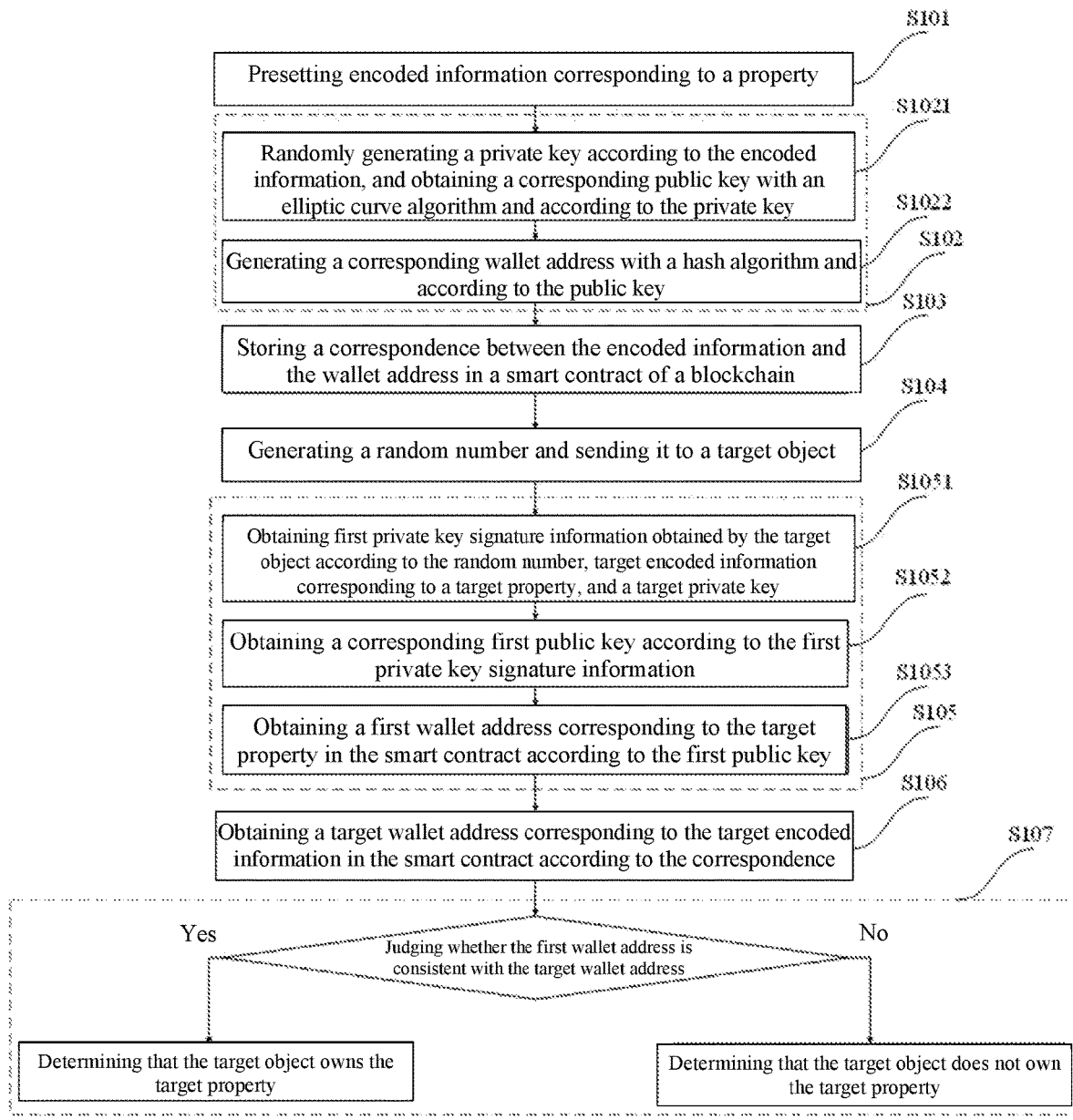
FIG. 2 is a flowchart of a blockchain-based method for confirming a property right according to Example 2 of the present disclosure.

As shown in FIG. 2, a blockchain-based method for confirming a property right in this example is a further implementation of Example 1. Specifically, Step S102 includes:

S1021, randomly generating a private key according to the encoded information, and obtaining a corresponding public key with an elliptic curve algorithm and according to the private key;

S1022, generating a corresponding wallet address with a hash algorithm and according to the public key.

Step S105 includes:

S1051, obtaining first private key signature information obtained by the target object according to the random number, the target encoded information corresponding to the target property, and the target private key;

specifically, obtaining a hash value calculated by the target object with an asymmetric encryption algorithm and according to the random number and the target encoded information corresponding to the target property;

obtaining the first private key signature information calculated by the target object according to the target private key corresponding to the target property and the hash value;

S1052, obtaining the corresponding first public key according to the first private key signature information; specifically, the corresponding first public key is calculated according to the first private key signature information and the hash value.

S1053, obtaining the first wallet address corresponding to the target property in the smart contract according to the first public key.

The following is a specific description with examples.

When user a wants to prove to user b that he owns property A, user b generates random number r and sends it to user a;

user a calculates a hash value with a hash algorithm and according to random number r and encoded information corresponding to property A, and then calculates corresponding private key signature information sig=p(hash(gid_a, r)) with an ECDSA (Elliptic Curve Digital Signature Algorithm) and according to the hash value and private key p, and sends it to user b;

user b calculates a public key according to private key signature information sig and the hash value, the public key=verify(sig, hash(gid_a, r)), and calculates a first wallet address corresponding to the property in the smart contract according to the public key. In one example, the verify function is an ECDSA verify algorithm that relies on EC point multiplication. In one example, an algorithm to verify an ECDSA signature takes as input the signed message msg, the signature {r, s} produced from the signing algorithm, and the public key pubKey, corresponding to the signer's private key. The ECDSA signature scheme allows for a public key to be recovered from a signed message together with the signature. One example of a ECDSA recovery process is based on mathematical computations described in Section 1 of Standards for Efficient Cryptography (SECG: SEC 1 standard) and returns 0, 1 or 2 possible EC points that are valid public keys, corresponding to the signature. To avoid this ambiguity, some ECDSA implementations add one additional bit v to the signature during the signing process and it takes the form {r, s, v}. From this extended ECDSA signature {r, s, v}+the signed message, the signer's public key can be restored;

the calculated first wallet address and a target wallet address corresponding to property A recorded in the smart contract are then compared. If they are consistent, it is determined that user a uses the private key corresponding to the target wallet address, that is, user a owns property A.

Compared with an existing process of confirming a right through the transmission of original certification documents for certification, the process of confirming a right in this example belongs to the transmission and verification of signature information, making the entire right confirmation process more convenient, efficient, and secure.

In this example, encoded information of each property is preset, and a correspondence between the encoded information of each property and a wallet address is recorded in a smart contract of a blockchain; when it is necessary to verify whether an object owns a property, private key signature information is obtained through a random number, a private key provided by the object, and encoded information of the property, and then a public key and its corresponding wallet address are obtained. When the wallet address is consistent with a wallet address of the encoded information in the blockchain, the right confirmation is successful. That is, the digitalization of notarization of the property can be realized based on the blockchain, then the digitalization of the ownership of the property can be realized, and the path of ownership confirmation can be optimized, making the confirmation process more efficient and secure, and improving the user experience.

Example 3

The blockchain-based method for transferring the ownership of a property in this example is implemented based on the blockchain-based method for confirming a property right in any one of Examples 1 or 2.

Figure 3:
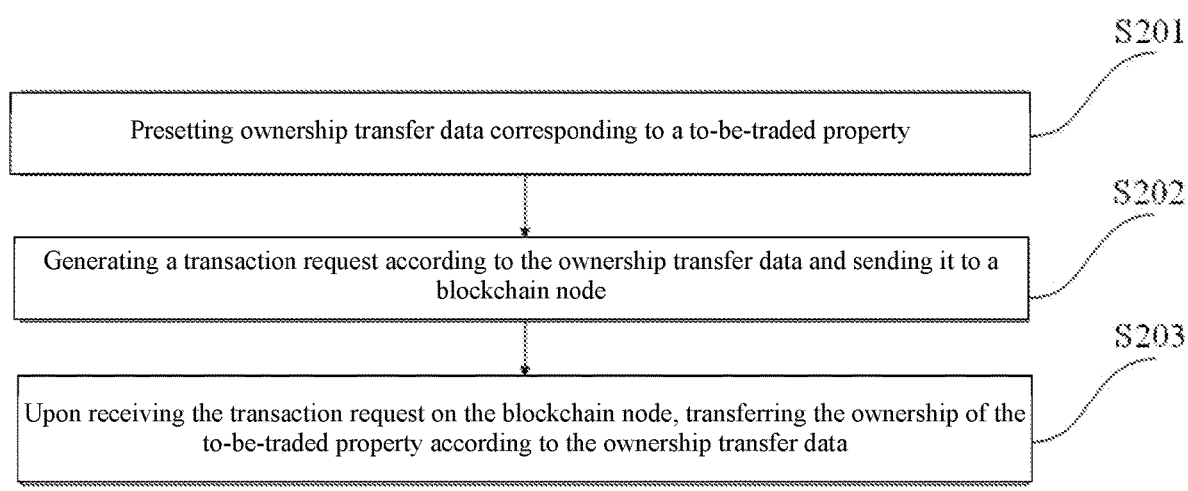
FIG. 3 is a flowchart of a blockchain-based method for transferring the ownership of a property according to Example 3 of the present disclosure.

As shown in FIG. 3, the blockchain-based method for transferring the ownership of a property in this example includes:

S201, presetting ownership transfer data corresponding to a to-be-traded property;

S202, generating a transaction request according to the ownership transfer data and sending it to a blockchain node;

S203, upon receiving the transaction request on the blockchain node, transferring the ownership of the to-be-traded property according to the ownership transfer data.

At this time, a mapping relationship between encoded information and new wallet addresses is recorded in the smart contract, i.e., gid=>new_address, where new_address represents a new wallet address, which corresponds to a new user.

Specifically, each ownership transfer will generate a Transfer event in the blockchain, which includes, but is not limited to, encoded information of a property of which the original wallet address or a new wallet address is transferred. In one example, a transaction includes a call to the Ethereum Virtual Machine (EVM) to interact with a NFT smart contract or an account. A transaction request may include providing information for one or more of the following fields:

recipient address;

signature identifying the sender;

nonce, the number of transactions made by the account to avoid replay attacks data field, for a smart contract this may be the compiled bytecode, for a contract function call, it will be the arguments of the function.

All transfer time and other information of the property can be learned about by tracing back the Transfer event. Based on the non-tamperable characteristics of blockchain information, the confirmation of the ownership of a property and traceback of the transfer process can be realized to achieve the purpose of safeguarding ownership rights.

In this example, by sending ownership transfer data to a blockchain node, the direct transfer of the ownership of a property is realized; in addition, based on the non-tamperable characteristics of blockchain information, the traceback of the ownership of the property is realized, which is convenient for safeguarding the ownership of the property. That is, the digitization of notarization of a property can be realized based on a blockchain, then the digitization of the ownership of the property can be realized, and the path of confirming, implementing, and safeguarding the ownership can be optimized, making the process of right confirmation and implementation more efficient and secure, thus improving the user experience.

Example 4

Figure 4:
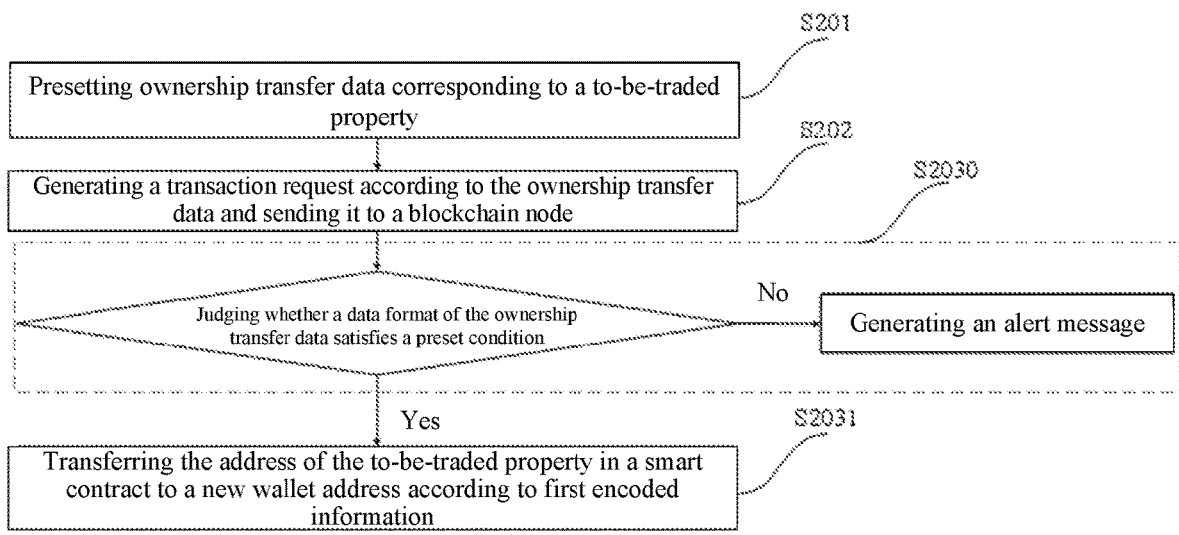
FIG. 4 is a flowchart of a blockchain-based method for transferring the ownership of a property according to Example 4 of the present disclosure.

As shown in FIG. 4, a blockchain-based method for transferring the ownership of a property in this example is a further implementation of Example 3. Specifically, the ownership transfer data includes a smart contract address, transaction parameters, and a transaction signature. In one example, the transaction signature=secp256k1 (blake2b256(RLP encoded transaction), private key), is generated by transaction sender, for example, the person transferring an NFT, wherein:

secp256k1 refers to the parameters of the elliptic curve.

blake2b256 is a cryptographic hash function based on BLAKE.

RLP(Recursive Length Prefix) is a way of encoding arbitrarily nested arrays of binary data.

The transaction parameters include, but are not limited to, a transfer instruction, first encoded information corresponding to the to-be-traded property, and a new wallet address.

After step S202 and before step S203, the method further includes:

S2030, judging whether a data format of the ownership transfer data satisfies a preset condition, and if yes, executing the step of transferring the ownership of the to-be-traded property according to the ownership transfer data; otherwise, generating an alert message. In one example, judging whether a data format of the ownership transfer data satisfies a preset condition includes checking if a transaction sender is the NFT holder. If so, the NFT smart contract transfers the NFT to the address in the '_to' address field f the NFT smart contract and emits a Transfer Event (which is triggered when NFTs are transferred).

Step S203 includes:

S2031, transferring the address of the to-be-traded property in the smart contract to a new wallet address according to the first encoded information.

When the ownership of a property is transferred indirectly, it mainly includes two cases: authorization before transfer, and application before transfer. Authorization before transfer may include owner A authorizing a third party C, such as an auction house, law firm, or other authorized third party, to sign on behalf of owner A to transfer the property to a new owner B. In one example, an NFT smart contract includes a transfer function 'transferFrom', which may be initiated by the owner of an NFT or an approved address associated with the NFT. The owner of an NFT can send an 'approve' transaction to the NFT smart contract to authorize a new NFT controller while maintaining ownership of the NFT with owner A. The new approved token controller, for example, third party C, such as an auction house, then can easily send a 'tranferFrom' transaction to the NFT smart contract to transfer the authorized token to a new '_to' address (e.g. new owner B). Thus, the approved address (the address of third party C) can initiate a transfer of ownership to new owner B at the appropriate time without ever having access the private key of NFT owner A. In some examples, the approve transaction may include limits, such as a time limit, where third party C's authorization expires after he time limit has been met.

Application before transfer may include a buyer B of an asset sending a request to seller A to transfer the NFT for the asset to buyer B, for example, after B has purchased the NFT and/or an asset associated with the NFT from owner A. In one example, an NFT smart contract may include an 'applyFor' function that allows a party (e.g. buyer B) to apply to have the NFT(s) transferred from the current NFT owner to buyer B. Buyer B can send an applyFof transaction to the NFT smart contract to identify the tokens he wants to hold. The NFT smart contract may be configured to emit an 'Application' event in response to receipt of the ' applyFor' transaction. Current owner, A may receive a notification from a messaging system configured to monitor for 'Application' events in the blockchain that notifies owner A of who has submitted the 'applyFor' transaction and the NFT(s) the submitter has applied for. If owner A agrees, he can send a 'transfer' transaction signed by his private key to the NFT smart contract to initiate the applied-for transfer.

For authorization before transfer, step S201 includes:
generating an authorization instruction for transferring the ownership of the to-be-traded property to an authorized object; and
presetting ownership transfer data corresponding to the to-be-traded property according to the authorization instruction.

Step S203 includes:
transferring the ownership of the to-be-traded property to the authorized object according to the ownership transfer data, wherein the authorized object completes the signing and transfer of the blockchain node.

For application before transfer, step S201 includes:
obtaining an application request sent by a requesting object for requesting the ownership of the to-be-traded property; and
presetting ownership transfer data corresponding to the to-be-traded property according to the application request.

Step S203 includes:
transferring the ownership of the to-be-traded property to the requesting object based on the ownership transfer data.

In this example, by sending directly or indirectly transferred ownership transfer data to a blockchain node, the transfer of the ownership of a property is realized; in addition, based on the non-tamperable characteristics of blockchain information, the traceback of the ownership of the property is realized, which is convenient for safeguarding the ownership of the property. That is, the digitization of notarization of a property can be realized based on a blockchain, then the digitization of the ownership of the property can be realized, and the path of confirming, implementing, and safeguarding the ownership can be optimized, making the process of right confirmation and implementation more efficient and secure, thus improving the user experience.

Example 5

Figure 5:
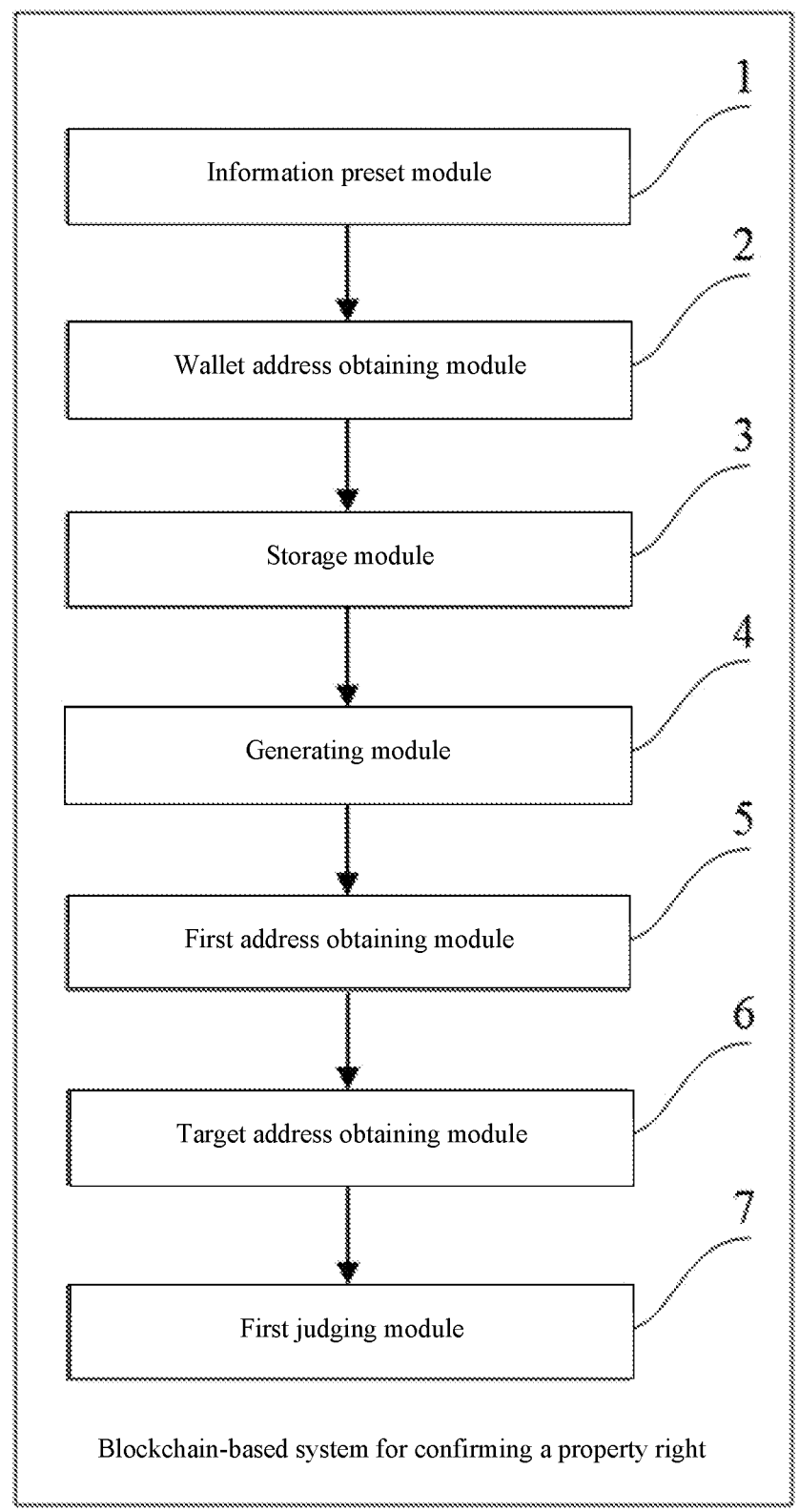
FIG. 5 is a schematic diagram of modules of a blockchain-based system for confirming a property right according to Example 5 of the present disclosure.

As shown in FIG. 5, a blockchain-based system for confirming a property right in this example includes information preset module 1, wallet address obtaining module 2, storage module 3, generating module 4, first address obtaining module 5, target address obtaining module 6, and first judging module 7.

Information preset module 1 is configured to preset encoded information corresponding to a property.

Wallet address obtaining module 2 is configured to obtain a corresponding wallet address according to the encoded information.

Storage module 3 is configured to store a correspondence between the encoded information and the wallet address in a smart contract of a blockchain, that is, to record a mapping relationship between encoded information and wallet addresses in the smart contract, for example, gid=>address, where gid represents encoded information, address represents a wallet address, and the wallet address represents that a user owns a corresponding property.

Generating module 4 is configured to generate a random number and send it to a target object.

First address obtaining module 5 is configured to obtain a first wallet address corresponding to a target property in the smart contract obtained by the target object according to the random number, target encoded information corresponding to the target property, and a target private key.

Target address obtaining module 6 is configured to obtain a target wallet address corresponding to the target encoded information in the smart contract according to the correspondence.

First judging module 7 is configured to judge whether the first wallet address is consistent with the target wallet address, and if yes, determine that the target object owns the target property; otherwise, determine that the target object does not own the target property.

In this example, encoded information of each property is preset, and a correspondence between the encoded information of each property and a wallet address is recorded in a smart contract of a blockchain; when it is necessary to verify whether an object owns a property, private key signature information is obtained through a random number, a private key provided by the object, and encoded information of the property, and then a public key and its corresponding wallet address are obtained. When the wallet address is consistent with a wallet address of the encoded information in the blockchain, the right confirmation is successful. That is, the digitalization of notarization of the property can be realized based on the blockchain, then the digitalization of the ownership of the property can be realized, and the path of ownership confirmation can be optimized, making the confirmation process more efficient and secure, and improving the user experience.

Example 6

Figure 6:
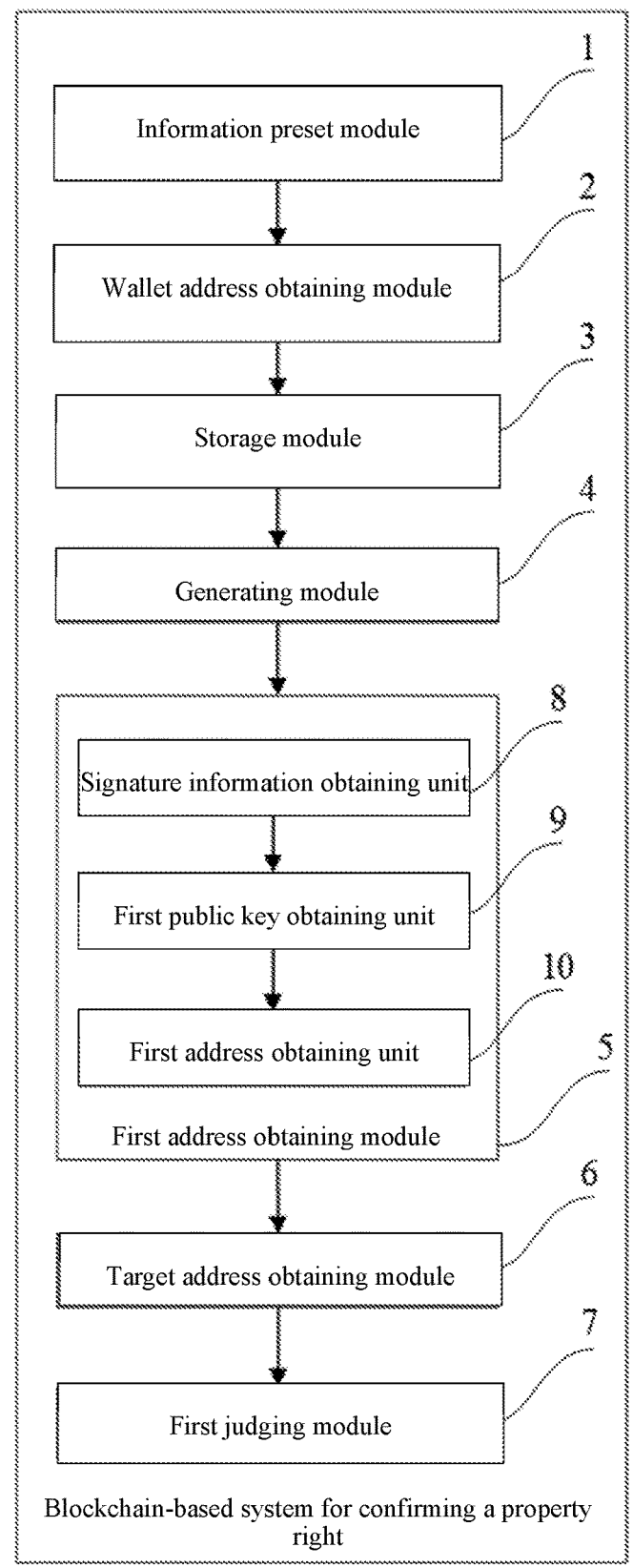
FIG. 6 is a schematic diagram of modules of a blockchain-based system for confirming a property right according to Example 6 of the present disclosure.

As shown in FIG. 6, a blockchain-based system for confirming a property right in this example is a further implementation of Example 5. Specifically, wallet address obtaining module 2 is configured to randomly generate a private key according to the encoded information, and obtain a corresponding public key with an elliptic curve algorithm and according to the private key.

Wallet address obtaining module 2 is also configured to obtain the corresponding wallet address with a hash algorithm and according to the public key.

First address obtaining module 5 includes signature information obtaining unit 8, first public key obtaining unit 9, and first address obtaining unit 10.

Signature information obtaining unit 8 is configured to obtain first private key signature information obtained by the target object according to the random number, the target encoded information corresponding to the target property, and the target private key.

First public key obtaining unit 9 is configured to obtain the corresponding first public key according to the first private key signature information.

Specifically, signature information obtaining unit 8 is configured to obtain a hash value that is calculated by the target object with an asymmetric encryption algorithm and according to the random number and the target encoded information corresponding to the target property, and obtain the first private key signature information that is calculated by the target object according to the target private key corresponding to the target property and the hash value.

First public key obtaining unit 9 is configured to calculate a corresponding first public key according to the first private key signature information and the hash value.

First address obtaining unit 10 is configured to obtain the first wallet address corresponding to the target property in the smart contract according to the first public key.

The following is a specific description with examples.

When user a proves to user b that he owns property A, user b generates random number r and sends it to user a; user a calculates a hash value with a hash algorithm and according to random number r and encoded information corresponding to property A, and then calculates corresponding private key signature information sig=p (hash(gid_a, r)) with an ECDSA and according to the hash value and private key p, and sends it to user b;

user b calculates a public key according to private key signature information sig and the hash value, the public key=verify(sig, hash(gid_a, r)), and calculates a first wallet address corresponding to the property in the smart contract according to the public key; and the calculated first wallet address and a target wallet address corresponding to property A recorded in the smart contract are compared. If they are consistent, it is determined that user a uses the private key corresponding to the target wallet address, that is, user a owns property A.

Compared with an existing process of confirming a right through the transmission of original certification documents for certification, the process of confirming a right in this example belongs to the transmission and verification of signature information, making the entire right confirmation process more convenient, efficient, and secure.

In this example, encoded information of each property is preset, and a correspondence between the encoded information of each property and a wallet address is recorded in a smart contract of a blockchain; when it is necessary to verify whether an object owns a property, private key signature information is obtained through a random number, a private key provided by the object, and encoded information of the property, and then a public key and its corresponding wallet address are obtained. When the wallet address is consistent with a wallet address of the encoded information in the blockchain, the right confirmation is successful. That is, the digitalization of notarization of the property can be realized based on the blockchain, then the digitalization of the ownership of the property can be realized, and the path of ownership confirmation can be optimized, making the confirmation process more efficient and secure, and improving the user experience.

Example 7

The blockchain-based system for transferring the ownership of a property in this example is implemented based on the blockchain-based system for transferring the ownership of a property in any one of Examples 5 or 6.

Figure 7:
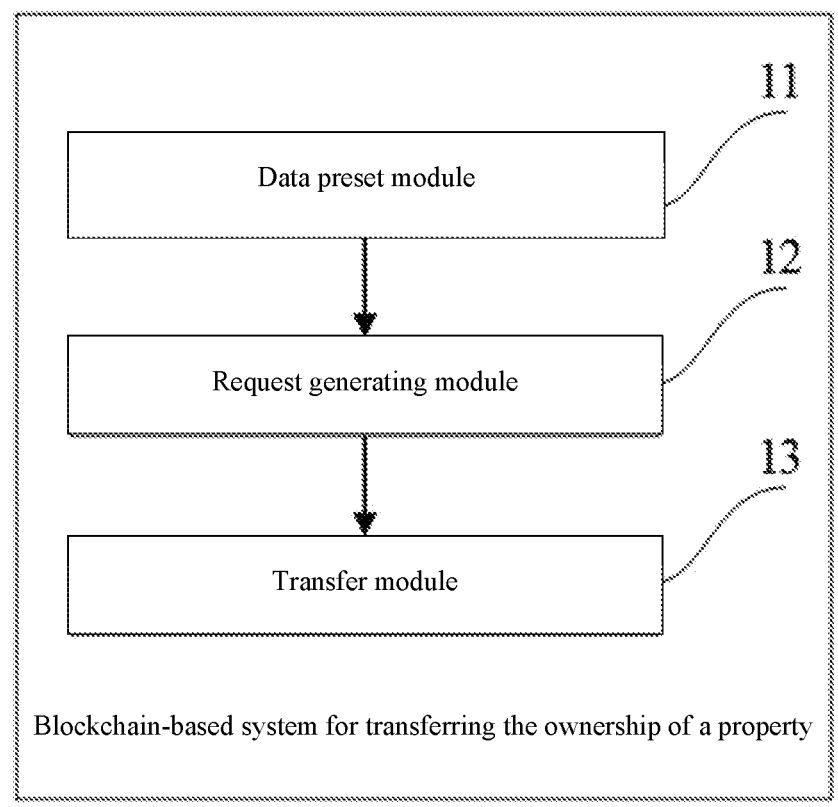
FIG. 7 is a schematic diagram of modules of a blockchain-based system for transferring the ownership of a property according to Example 7 of the present disclosure.

As shown in FIG. 7, the blockchain-based system for transferring the ownership of a property in this example includes data preset module 11, request generating module 12, and transfer module 13.

Data preset module 11 is configured to preset ownership transfer data corresponding to a to-be-traded property.

Request generating module 12 is configured to generate a transaction request according to the ownership transfer data and send it to a blockchain node.

Transfer module 13 is configured to, upon receiving the transaction request on the blockchain node, transfer the ownership of the to-be-traded property according to the ownership transfer data.

At this time, a mapping relationship between encoded information and new wallet addresses is recorded in the smart contract, i.e., gid=>new_address, where new_address represents a new wallet address, which corresponds to a new user.

Specifically, each ownership transfer will generate a Transfer event in the blockchain, which includes, but is not limited to, encoded information of a property of which the original wallet address or a new wallet address is transferred. All transfer time and other information of the property can be learned about by tracing back the Transfer event. Based on the non-tamperable characteristics of blockchain information, the confirmation of the ownership of a property and traceback of the transfer process can be realized to achieve the purpose of right safeguard.

In this example, by sending ownership transfer data to a blockchain node, the direct transfer of the ownership of a property is realized; in addition, based on the non-tamperable characteristics of blockchain information, the traceback of the ownership of the property is realized, which is convenient for safeguarding the ownership of the property. That is, the digitization of notarization of a property can be realized based on a blockchain, then the digitization of the ownership of the property can be realized, and the path of confirming, implementing, and safeguarding the ownership can be optimized, making the process of right confirmation and implementation more efficient and secure, thus improving the user experience.

Example 8

Figure 8:
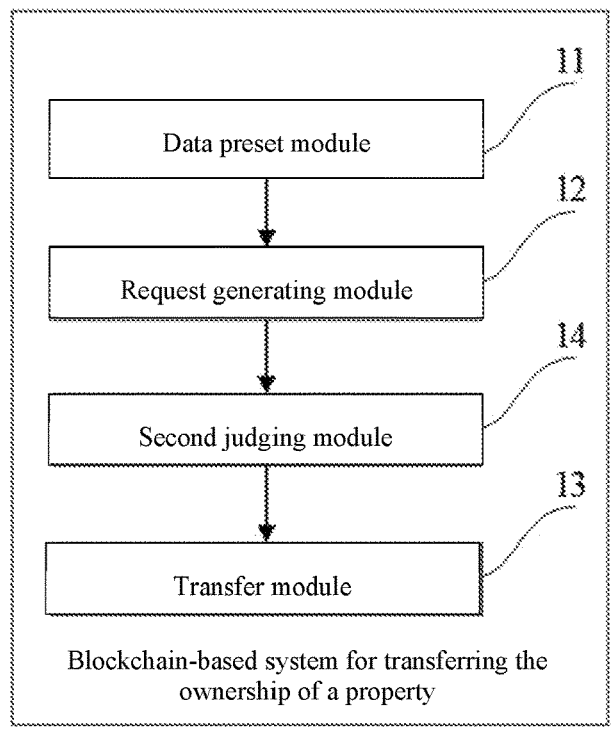
FIG. 8 is a schematic diagram of modules of a blockchain-based system for transferring the ownership of a property according to Example 8 of the present disclosure.

As shown in FIG. 8, the blockchain-based system for transferring the ownership of a property in this example is a further implementation of Example 7. Specifically, the ownership transfer data includes a smart contract address, transaction parameters, and a transaction signature.

The transaction parameters include, but are not limited to, a transfer instruction, first encoded information corresponding to the to-be-traded property, and a new wallet address.

Transfer module 13 is configured to transfer the address of the to-be-traded property in the smart contract to a new wallet address according to the first encoded information.

The ownership transfer system of this example further includes second judging module 14.

Second judging module 14 is configured to judge whether a data format of the ownership transfer data satisfies a preset condition, and if yes, execute the step of transferring the ownership of the to-be-traded property according to the ownership transfer data; otherwise, generate an alert message.

When the ownership of a property is transferred indirectly, it mainly includes two cases: authorization before transfer, and application before transfer.

For authorization before transfer, data preset module 11 is configured to generate an authorization instruction for transferring the ownership of the to-be-traded property to an authorized object, and preset ownership transfer data corresponding to the to-be-traded property according to the authorization instruction.

Transfer module 13 is configured to transfer the ownership of the to-be-traded property to the authorized object according to the ownership transfer data, wherein the authorized object completes the signing and transfer of the blockchain node.

For application before transfer, data preset module 11 is configured to obtain an application request sent by a requesting object for requesting the ownership of the to-be-traded property, and preset ownership transfer data corresponding to the to-be-traded property according to the application request.

Transfer module 13 is configured to transfer the ownership of the to-be-traded property to the requesting object according to the ownership transfer data.

In this example, by sending directly or indirectly transferred ownership transfer data to a blockchain node, the transfer of the ownership of a property is realized; in addition, based on the non-tamperable characteristics of blockchain information, the traceback of the ownership of the property is realized, which is convenient for safeguarding the ownership of the property. That is, the digitization of notarization of a property can be realized based on a blockchain, then the digitization of the ownership of the property can be realized, and the path of confirming, implementing, and safeguarding the ownership can be optimized, making the process of right confirmation and implementation more efficient and secure, thus improving the user experience.

Example 9

Figure 9:
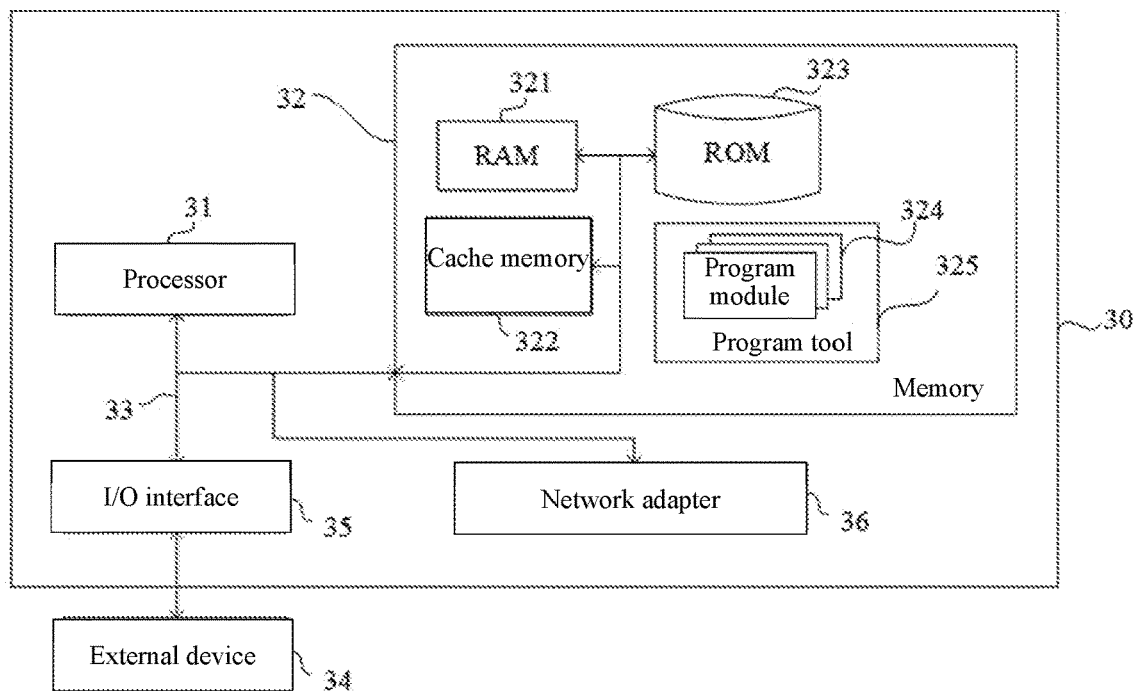
FIG. 9 is a schematic structural diagram of an electronic device that implements a blockchain-based method for confirming a property right according to Example 9 of the present disclosure.

FIG. 9 is a schematic structural diagram of an electronic device provided in Example 9 of the present disclosure. The electronic device includes a memory, a processor, and a computer program stored on the memory and runnable on the processor. When executing the program, the processor implements the blockchain-based method for confirming a property right in either Example 1 or Example 2. Electronic device 30 shown in FIG. 9 is only an example, and should not impose any limitation to the function and application scope of the examples of the present disclosure.

As shown in FIG. 9, electronic device 30 may be in the form of a general-purpose computing device. For example, it may be a server device. Components of electronic device 30 may include, but are not limited to: the above-mentioned at least one processor 31, the above-mentioned at least one memory 32, and bus 33 connecting different system components (including memory 32 and processor 31).

Bus 33 includes a data bus, an address bus, and a control bus.

Memory 32 may include a volatile memory, such as random access memory (RAM) 321 and/or cache memory 322, and may further include read only memory (ROM) 323.

Memory 32 may also include program/utility tool 325 having a set of (at least one) program modules 324. Such program module 324 include but is not limited to: an operating system, one or more application programs, other program modules, and program data. Each or some combination of the examples may include the implementation of a network environment.

Processor 31 executes various functional applications and data processing by running a computer program stored in memory 32, such as the blockchain-based method for confirming a property right in any one of Examples 1 or 2 of the present disclosure.

Electronic device 30 may also communicate with one or more external devices 34 (such as keyboards, pointing devices, etc.). This communication can be performed through input/output (I/O) interface 35. In addition, device 30 generated by a model may also communicate with one or more networks (for example, a local area network (LAN), a wide area network (WAN), and/or a public network, such as the Internet) through network adapter 36. As shown in FIG. 9, network adapter 36 communicates with other modules of device 30 generated by a model through bus 33. It should be understood that, although not shown in the figure, other hardware and/or software modules can be used in conjunction with device 30 generated by a model, including but not limited to: microcode, device drivers, redundant processors, external disk drive arrays, RAID (disk array) systems, tape drives, data backup storage systems, etc.

It should be noted that although several units/modules or sub-units/modules of the electronic device are mentioned in the above detailed description, this division is only illustrative and not mandatory. In fact, according to the examples of the present disclosure, the features and functions of two or more units/modules described above can be embodied in one unit/module. Conversely, the features and functions of one unit/module described above can be further divided into multiple units/modules to be embodied.

Example 10

Example 10 of the present disclosure provides an electronic device. The electronic device includes a memory, a processor, and a computer program stored in the memory and runnable on the processor. When executing the program, the processor implements the blockchain-based method for transferring the ownership of a property in either example 3 or example 4. For the specific structure of the electronic device, reference can be made to the electronic device in Example 9. The working principle of the electronic device is basically the same as that of the electronic device in Example 9, and will not be repeated here.

Example 11

This example provides a computer-readable storage medium on which a computer program is stored. When the program is executed by a processor, steps of the blockchain-based method for determining a property right in any one of Example 1 or 2 are implemented.

The readable storage medium may more specifically include but is not limited to: a portable disk, a hard disk, a random access memory, a read only memory, an erasable programmable read only memory, an optical storage device, a magnetic storage device, or any appropriate combination of the above.

In a possible implementation, the present disclosure can also be implemented in the form of a program product, which includes program code. When the program product runs on a terminal device, the program code is configured to make the terminal device execute to implement steps of the blockchain-based method for determining a property right in any one of Example 1 or 2.

The program code for executing the present disclosure can be written in any combination of one or more programming languages. The program code can be entirely executed on user equipment, partly executed on user equipment, executed as an independent software package, partly executed on user equipment and partly executed on a remote device, or entirely executed on a remote device.

Example 12

This example provides a computer-readable storage medium on which a computer program is stored. When the program is executed by a processor, steps of the blockchain-based method for transferring the ownership of a property in any one of Example 3 or 4 are implemented.

The readable storage medium may more specifically include but is not limited to: a portable disk, a hard disk, a random access memory, a read only memory, an erasable programmable read only memory, an optical storage device, a magnetic storage device, or any appropriate combination of the above.

In a possible implementation, the present disclosure can also be implemented in the form of a program product, which includes program code. When the program product runs on a terminal device, the program code is configured to make the terminal device execute to implement steps of the blockchain-based method for transferring the ownership of a property in any one of Example 3 or 4.

The program code configured to execute the present disclosure can be written in any combination of one or more programming languages, and the program code can be entirely executed on user equipment, partially executed on user equipment, executed as an independent software package, partly executed on user equipment and partly executed on a remote device, or entirely executed on a remote device.

Although the specific examples of the present disclosure have been described above, those skilled in the art should understand that this is only an example, and the protection scope of the present disclosure is defined by the appended claims. Those skilled in the art can make various changes or modifications to these implementations without departing from the principle and essence of the present disclosure, but these changes and modifications all fall within the protection scope of the present disclosure.

The invention claimed is:

1. A method, comprising:
   presetting encoded information corresponding to a property;
   obtaining a corresponding wallet address according to the encoded information;
   storing a correspondence between the encoded information and the wallet address in a smart contract of a blockchain;
   generating a random number and sending the random number to a target object;
   obtaining a first wallet address corresponding to a target property in the smart contract obtained by the target object according to the random number, target encoded information corresponding to the target property, and a target private key;
   obtaining a target wallet address corresponding to the target encoded information in the smart contract according to the correspondence; and
   judging whether the first wallet address is consistent with the target wallet address, and if yes, determining that the target object owns the target property; otherwise, determining that the target object does not own the target property,
   wherein the step of obtaining a corresponding wallet address according to the encoded information comprises:
      randomly generating a private key according to the encoded information, and obtaining a corresponding public key with an elliptic curve algorithm and according to the private key; and
      obtaining the corresponding wallet address with a hash algorithm and according to the public key.

2. A method, comprising:
   presetting encoded information corresponding to a property;
   obtaining a corresponding wallet address according to the encoded information;
   storing a correspondence between the encoded information and the wallet address in a smart contract of a blockchain;
   generating a random number and sending the random number to a target object;
   obtaining a first wallet address corresponding to a target property in the smart contract obtained by the target object according to the random number, target encoded information corresponding to the target property, and a target private key;
   obtaining a target wallet address corresponding to the target encoded information in the smart contract according to the correspondence; and
   judging whether the first wallet address is consistent with the target wallet address, and if yes, determining that the target object owns the target property; otherwise, determining that the target object does not own the target property,
   wherein the step of obtaining a first wallet address corresponding to a target property in the smart contract obtained by the target object according to the random number, target encoded information corresponding to the target property, and a target private key comprises:
      obtaining first private key signature information obtained by the target object according to the random number, the target encoded information corresponding to the target property, and the target private key;
      obtaining a corresponding first public key according to the first private key signature information; and
      obtaining the first wallet address corresponding to the target property in the smart contract according to the first public key.

3. The method of claim 2, wherein the step of obtaining first private key signature information obtained by the target object according to the random number, the target encoded information corresponding to the target property, and the target private key comprises:
   obtaining a hash value calculated by the target object with an asymmetric encryption algorithm and according to the random number and the target encoded information corresponding to the target property; and
   obtaining the first private key signature information calculated by the target object according to the target private key corresponding to the target property and the hash value; and
   the step of obtaining a corresponding first public key according to the first private key signature information comprises:
   calculating the corresponding first public key according to the first private key signature information and the hash value.

4. A method, comprising:
   presetting encoded information corresponding to a property;
   obtaining a corresponding wallet address according to the encoded information;
   storing a correspondence between the encoded information and the wallet address in a smart contract of a blockchain;
   generating a random number and sending the random number to a target object;
   obtaining a first wallet address corresponding to a target property in the smart contract obtained by the target object according to the random number, target encoded information corresponding to the target property, and a target private key;

obtaining a target wallet address corresponding to the target encoded information in the smart contract according to the correspondence;

judging whether the first wallet address is consistent with the target wallet address, and if yes, determining that the target object owns the target property; otherwise, determining that the target object does not own the target property;

presetting ownership transfer data corresponding to a to-be-traded property;

generating a transaction request according to the ownership transfer data and sending the transaction request to a blockchain node; and upon receiving the transaction request on the blockchain node, transferring the ownership of the to-be-traded property according to the ownership transfer data;

wherein the ownership transfer data comprises a smart contract address, transaction parameters, and a transaction signature;

wherein the transaction parameters comprise a transfer instruction, first encoded information corresponding to the to-be-traded property, and a new wallet address;

the step of transferring the ownership of the to-be-traded property according to the ownership transfer data comprises:

transferring the address of the to-be-traded property in a smart contract to a new wallet address according to the first encoded information; and/or after the step of generating a transaction request according to the ownership transfer data and sending the transaction request to the blockchain node, and before the step of transferring the ownership of the to-be-traded property according to the ownership transfer data, the method further comprises:

judging whether a data format of the ownership transfer data satisfies a preset condition, and if yes, executing the step of transferring the ownership of the to-be-traded property according to the ownership transfer data; otherwise, generating an alert message.

5. A blockchain-based system for confirming a property right, the system for confirming a right comprising an information preset module, a wallet address obtaining module, a storage module, a generating module, a first address obtaining module, a target address obtaining module, and a first judging module;

wherein the information preset module is configured to preset encoded information corresponding to a property;

the wallet address obtaining module is configured to obtain a corresponding wallet address according to the encoded information;

the storage module is configured to store a correspondence between the encoded information and the wallet address in a smart contract of a blockchain;

the generating module is configured to generate a random number and send the random number to a target object;

the first address obtaining module is configured to obtain a first wallet address corresponding to a target property in the smart contract obtained by the target object according to the random number, the target encoded information corresponding to the target property, and a target private key;

the target address obtaining module is configured to obtain a target wallet address corresponding to the target encoded information in the smart contract according to the correspondence; and the first judging module is configured to judge whether the first wallet address is consistent with the target wallet address, and if yes, determine that the target object owns the target property;

otherwise, determine that the target object does not own the target property, wherein the wallet address obtaining module is configured to randomly generate a private key according to the encoded information, and obtain a corresponding public key with an elliptic curve algorithm and according to the private key; and the wallet address obtaining module is further configured to obtain the corresponding wallet address with a hash algorithm and according to the public key.

6. A blockchain-based system for confirming a property right, the system for confirming a right comprising an information preset module, a wallet address obtaining module, a storage module, a generating module, a first address obtaining module, a target address obtaining module, and a first judging module;

wherein the information preset module is configured to preset encoded information corresponding to a property;

the wallet address obtaining module is configured to obtain a corresponding wallet address according to the encoded information;

the storage module is configured to store a correspondence between the encoded information and the wallet address in a smart contract of a blockchain;

the generating module is configured to generate a random number and send the random number to a target object;

the first address obtaining module is configured to obtain a first wallet address corresponding to a target property in the smart contract obtained by the target object according to the random number, the target encoded information corresponding to the target property, and a target private key:

the target address obtaining module is configured to obtain a target wallet address corresponding to the target encoded information in the smart contract according to the correspondence; and the first judging module is configured to judge whether the first wallet address is consistent with the target wallet address, and if yes, determine that the target object owns the target property;

otherwise, determine that the target object does not own the target property, wherein the first address obtaining module comprises a signature information obtaining unit, a first public key obtaining unit, and a first address obtaining unit;

the signature information obtaining unit is configured to obtain first private key signature information obtained by the target object according to the random number, the target encoded information corresponding to the target property, and the target private key;

the first public key obtaining unit is configured to obtain a corresponding first public key according to the first private key signature information; and the first address obtaining unit is configured to obtain the first wallet address corresponding to the target property in the smart contract according to the first public key.

7. The blockchain-based system for confirming a property right of claim 6, wherein the signature information obtaining unit is configured to obtain a hash value that is calculated by the target object with an asymmetric encryption algorithm and according to the random number and the target encoded information corresponding to the target property;

obtain the first private key signature information that is calculated by the target object according to the target private key corresponding to the target property and the hash value; and the first public key obtaining unit is configured to calculate the corresponding first public key according to the first private key signature information and the hash value.

8. An electronic device, comprising a memory, a processor, and a computer program stored on the memory and runnable on the processor, wherein when executing the computer program, the processor implements the method of claim 1.

9. A non-transitory computer-readable storage medium with a computer program stored thereon and configured to be executed by a processor, the computer program including instructions for performing the method of claim 1.

* * * * *